United States Patent [19]

Warner

[11] Patent Number: 5,061,757

[45] Date of Patent: Oct. 29, 1991

[54] HIGH IMPACT STRENGTH POLYAMIDE BLENDS AND METHOD FOR PREPARATION THEREOF

[75] Inventor: W. Michael Warner, Henderson, Ky.

[73] Assignee: Bemis Company, Inc., Minneapolis, Minn.

[21] Appl. No.: 299,875

[22] Filed: Jan. 23, 1989

Related U.S. Application Data

[63] Continuation of Ser. No. 829,184, Feb. 14, 1986, abandoned, which is a continuation of Ser. No. 739,202, May 30, 1985, abandoned, which is a continuation of Ser. No. 618,201, Jun. 7, 1984, abandoned, which is a continuation of Ser. No. 464,860, Feb. 8, 1983, abandoned, which is a continuation of Ser. No. 330,647, Dec. 14, 1981, abandoned, which is a continuation of Ser. No. 166,899, Jul. 9, 1980, abandoned.

[51] Int. Cl.$^5$ .............................................. C08L 77/00
[52] U.S. Cl. ..................................... 525/179; 525/919
[58] Field of Search ............................... 525/179, 919

[56] References Cited

U.S. PATENT DOCUMENTS

| | | | |
|---|---|---|---|
| 3,264,272 | 8/1966 | Rees | 525/143 |
| 3,373,223 | 3/1968 | Armstrong | 260/857 |
| 3,373,224 | 3/1968 | Merrobian | 260/857 |
| 3,375,219 | 3/1968 | Robb | 260/41 |
| 3,492,367 | 1/1970 | Starkweather | 525/183 |
| 3,579,483 | 4/1969 | Twilley et al. | 528/383 |
| 3,676,400 | 7/1972 | Kohan | 260/857 |
| 3,845,163 | 10/1974 | Murch | 260/857 |
| 3,873,667 | 3/1975 | Preto | 264/324 |
| 4,086,295 | 4/1978 | Mori | 525/183 |
| 4,105,709 | 8/1978 | Iwami | 260/857 |
| 4,132,690 | 1/1979 | Eernstman | 525/183 |
| 4,160,790 | 7/1979 | Mason | 525/179 |
| 4,174,358 | 11/1979 | Epstein | 525/183 |
| 4,335,223 | 6/1982 | Flood | 525/183 |

OTHER PUBLICATIONS

Klempner, Agnew Chem. Int. Engl. 17, 97–106 (1978); "Interpenetrating Polymer Networks".
Schmitt, Agnew Chem. Int. Engl. 18, 273–295 (1979); "Polymer Alloys—Their Structure, Morphology and Properties".

*Primary Examiner*—Ana L. Carrillo
*Attorney, Agent, or Firm*—Senniger, Powers, Leavitt & Roedel

[57] ABSTRACT

High impact strength resin compositions and methods of preparations thereof. The compositions contain at least 60% polyamide together with an elastomer and a polymeric emulsifier. The elastomer is preferably a copolymer of ethylene and an acrylic ester, and the emulsifier is preferably an ethylene/acrylic ionomer with at least about 50% of the carboxyl groups neutralized by displacement of a proton with a metal ion. In a particularly preferred embodiment, the polyamide is dispersed in a continuous elastomeric phase.

7 Claims, 1 Drawing Sheet

HIGH IMPACT STRENGTH POLYAMIDE BLENDS AND METHOD FOR PREPARATION THEREOF

This is a continuation of application Ser. No. 829,184, filed Feb. 14, 1986, (now abandoned) which is a continuation of application Ser. No. 739,202, filed May 30, 1985 (now abandoned), which is a continuation of Ser. No. 618,201, filed June 7, 1984, (now abandoned), which is a continuation of Ser. No. 464,860, filed Feb. 8, 1983, (now abandoned), which is a continuation of Ser. No. 330,647, filed Dec. 14, 1981 (now abandoned), which is a continuation of Ser. No. 166,899, filed July 9, 1980 (now abandoned).

BACKGROUND OF THE INVENTION

This invention relates to the field of polyamide resin blends and more particularly to novel blends which exhibit exceptionally high impact strength and crack resistance.

Polyamide resins are generally considered to be relatively tough materials. Based on favorable tensile strength, elongation and impact properties, polyamide resins have been found useful in a variety of mechanical applications. Although polyamides exhibit good impact strength in most respects, they are quite susceptible to crack propagation, as a result of which their notched impact strength can be rather poor. Because of such susceptibility, products constituted of polyamide are subject to brittle failure under service conditions where a product containing incipient cracks is subjected to moderate or heavy impacts.

Extensive research has been conducted for the purpose of developing polyamide resin blends of improved impact strength, and especially of improved resistance under notched impact test conditions such as those utilized in the notched Izod impact test, ASTM D-256. Thus, for example, Epstein U.S. Pat. No. 4,174,358 discloses multiphase thermoplastic compositions in which various branched and straight chain polymers having a particle size in a range of 0.01 to 1.0 microns are dispersed in a polyamide matrix resin and wherein the ratio of the tensile modulus of the polyamide matrix resin to the tensile modulus of the dispersed polymer is greater than 10 to 1. Although Epstein discloses a great variety of resin blends, the performance of those blends under notched Izod impact test conditions varies widely and, in some instances, the elongation is relatively low. Great variation in tensile modulus is also exhibited by the numerous individual blends disclosed by Epstein.

Mason et al. U.S. Pat. No. 4,160,790 discloses three component blends consisting of polyamide, an ethylene/acrylic acid copolymer and an ethylene ethyl acrylate copolymer. The blends of Mason et al. are said to exhibit synergistic improvement in impact resistance, but the highest notched Izod impact strength reported is 3.1 ft.-lbs./in.

Iwami et al. U.S. Pat. No. 4,105,709 discloses blends containing polyamide and a partially saponified copolymer of ethylene and an acrylic ester. The saponified copolymer is partially acidified so that, as blended with the polyamide, it contains units of ethylene, the acrylic or methacrylic ester, a salt of acrylic or methacrylic acid, and free acid. Iwami et al. are also concerned with the object of providing improved impact strength but the best of the results reported for Izod impact strength is 12.5 kg-cm/cm.

Thus, a need has remained for polyamide blends of improved notched impact strength which also exhibit favorable elongation, melt strength and other desirable mechanical properties. More particularly, there has been a need for such resin blends which are adapted for use in both molding and extrusion applications including the extrusion of polyamide film.

SUMMARY OF THE INVENTION

Among the several objects of the present invention, therefore, may be noted the provision of polyamide resin blends having improved mechanical properties; the provision of such blends which exhibit improved resistance to crack propagation; the provision of such blends which possess favorable impact strength, especially notched Izod impact strength; the provision of such blends which possess high impact strength with adequate stiffness for molded part applications; the provision of such blends which requires no mold release agent; the provision of such blends which are suitable for extrusion into film; the provision of such blends which possess high melt strength; and the provision of a novel method for the preparation of polyamide resin blends having improved impact strength.

Briefly, therefore, the present invention is directed to a high impact strength resin composition. The composition comprises at least about 60% by weight of a polyamide, and an elastomer and a polymeric emulsifier in proportions sufficient that the polyamide is dispersed in a continuous elastomeric phase. The composition exhibits high resistance to crack propagation and a notched Izod impact strength of at least about 10 ft.lb./in. of notch.

The invention is further directed to a high impact strength resin composition comprising between about 60 and about 90% by weight polyamide, between about 5 and about 20% by weight of a copolymer of ethylene and an alkyl acrylate or alkyl methacrylate containing between about 1 and about 50% by weight of repeating units derived from the acrylic ester comonomer, and between about 5 and about 20% by weight of an ionomer comprising a copolymer of ethylene and of $\alpha,\beta$-unsaturated carboxylic acid in which at least about 50% of the carboxylic acid groups are neutralized by replacement of a proton with a metal ion.

The invention is also directed to a method for producing such a high impact strength resin. In this method, a blend is prepared comprising the aforesaid polyamide, ethylene/acrylic ester copolymer, and ionomer; and the blend is extruded at a temperature in excess of the melting point of the polyamide.

Also included in the invention is a method for producing high impact strength resin compositions in which a blend is prepared comprising at least 60% by weight of a polyamide, and an elastomer and a polymeric emulsifier in proportions sufficient for dispersal of the polyamide in a continuous elastomeric phase. The blend is subjected to intense mixing at a temperature in excess of the melting temperature of the polyamide. The mixing intensity is sufficient to disperse the polyamide in a continuous elastomeric phase.

Other objects and features will be in part apparent and in part pointed out hereinafter.

DESCRIPTION OF THE PREFERRED EMBODIMENTS

Figure 1:
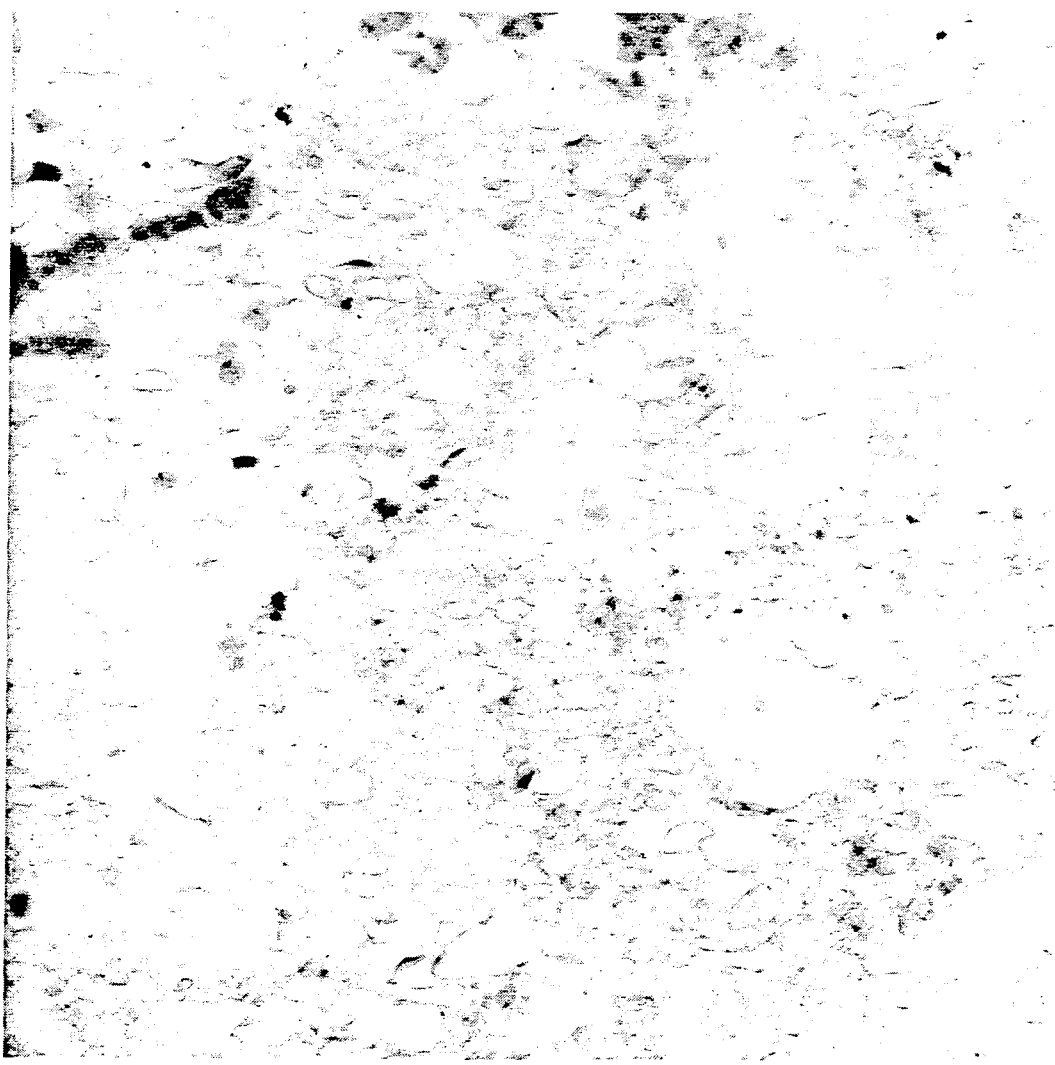
FIG. 1 is a photomicrograph of a typical resin blend of the invention showing dispersal of polyamide particles in a continuous elastomeric phase.

In accordance with the invention it has been discovered that a highly synergistic improvement in notched Izod impact strength is achieved from a three component blend of polyamide, an elastomer, and a polymeric emulsifier. Preferably the elastomer comprises an ethylene/alkyl acrylate or alkyl methacrylate copolymer, and the polymeric emulsifier comprises an ionomer. Outstanding improvement in impact strength is achieved where the ionomer comprises a copolymer of ethylene and an $\alpha,\beta$ unsaturated acid in which at least about 50% of the carboxylic acid groups are neutralized by a replacement of a proton with a metal ion.

Novel blends of the invention are produced by high intensity mixing and are most preferably characterized by a microstructure of the type illustrated in the photomicrograph of FIG. 1. In this embodiment, the blends comprise a continuous elastomeric phase in which the polyamide is dispersed by the polymeric emulsifier. Particles comprising polyamide and having a particle size between about 0.01 and about 20 microns are distributed as a separate phase in the continuous elastomeric phase. Blends of the invention having such a microstructure exhibit notched Izod impact strengths of 8.0 ft.-lb./in or more.

The dramatically enhanced impact strengths of the invention are particularly surprising when compared to two component blends of polyamide and up to 15% by weight of an ionomer of the type sold under the trade designation "Surlyn" by E. I. duPont de Nemours & Co., which exhibit notched Izod impact strengths in the range of approximately 1 to 3 ft.-lbs./in., and two component blends of polyamide and an ethylene/acrylic ester copolymer, which have Izod impact strengths in the range of 0.5 to 2 ft.-lbs./in. Most notably, it has been found that three component blends of certain ranges of proportions of all three of these resins exhibit markedly synergistically improved impact strengths in the range of approximately 12 to 15 ft.-lbs./in. Although we do not wish to be held to any particular theory, it is believed that dispersion of polyamide in a continuous elastomeric phase, combined with the interphase adhesion afforded by the presence of the ionomer, are the factors responsible for the surprising multiple improvement in notched Izod impact strength resistance. Bonding between the carboxyl groups of the ionomer and the amide groups of the polyamide contributes to the adhesion between the phases. It is believed that the polyamide is almost entirely contained in the dispersed phase while the copolymer of ethylene and acrylic ester is substantially entirely contained within the elastomeric phase. It is further believed that the ionomer is primarily contained within the matrix phase, but probably penetrates somewhat into the polyamide phase to promote interphase adhesion and toughness of the overall blend.

By means of the bonding believed to exist between the carboxyl groups of the ionomer and the amide groups of the polyamide, graft copolymers are considered to be produced which may either traverse the phase boundaries or otherwise promote linkage or interconnection between the phases. The nature and extent of the bonding is not known, but it is reasonably certain that bond energies at least corresponding to the strength of hydrogen bonds are realized. Some covalent bonding may also occur.

In some instances the blends of the invention unexpectedly posses a melting point that is actually higher than the melting point of the polyamide component thereof. While alloying of resins would normally be expected to result in decrease in melting point, increases of as high as 4-5 centigrade degrees have been observed.

Essentially any polyamide material may comprise the polyamide component of the blends of the invention. Nylon 6 (polycaprolactam) is preferred, but other polyamides such as polyhexamethyleneadipamide (Nylon 6/6) polyhexamethylenesebacamide (Nylon 610) poly--aminoundecanoic acid (Nylon 11) and poly(dodecyl lactam) (Nylon 12). The molecular weight of the polyamide is not critical but a relatively high molecular weight promotes flexural stiffness, a desirable property in many molding applications. Flexural stiffness tends to be reduced by blending with elastomers so it is advantageous to start with a polyamide having reasonably high stiffness properties. In the case of Nylon 6, a polyamide chain of 140 to 222 repeating units is typically useful, but lower and higher molecular weight materials can be used. Another parameter for identifying a generally preferred range of polyamides is solution viscosity which is typically between about 1.8 and 6.0 in 90% formic acid solution for suitable nylon resins.

As noted, the ionomer component promotes adhesion between the phases. A preferred ionomer is a copolymer of ethylene and acrylic acid that is partially neutralized by replacement of protons with metal ions. Ethylene/methacrylic acid ionomers of similar character may also be used. Preferably, the acrylic content of the copolymer is at least about 3% by weight. An important parameter is the degree of neutralization of the carboxylic acid units. To provide satisfactory impact resistance, it has been found essential that at least about 50% of the carboxyl groups be neutralized, and it is preferred that neutralization be in the range of 75% or more. Any of a variety of metal ions can be used for replacement of the proton of the carboxylic acid group. Examples of suitable metals include lithium, sodium, potassium, magnesium, calcium and zinc. Sodium and zinc are generally preferred. Exemplary ionomers which can be used in the blends of the invention include the copolymer of ethylene and acrylic acid having a melt index of 1, containing 10% by weight acrylic units and neutralized with sodium, sold under the trade designation "Surlyn 1856"; the copolymer of ethylene and acrylic acid having a melt index of 1, containing 10% acrylic units and 80% neutralized with zinc, sold under the trade designation "Surlyn 1855"; the copolymer of ethylene and acrylic acid having a melt index of 0.7 containing 15% by weight acrylic units and neutralized with zinc sold under the trade designation "Surlyn 1706"; "Surlyn 1554", a 1.1 melt index ionomer with 10% acid and 80% neutralized with zinc, has also been found useful; and the copolymer of ethylene and acrylic acid having a melt index of 0.9, containing 15% by weight acrylic units and neutralized with sodium, sold under the trade designation "Surlyn 1707"; all by E. I. DuPont. Alternatively, but less preferably, the ionomer may be produced in a preliminary step of the blending process through neutralization of a copolymer of ethylene and an α,β unsaturated acid such as, for example, the copolymer of ethylene and acrylic acid having an acid content of 8% by weight, a melt index of 5.5 and a density of 0.932 g/cc sold under the trade designation EAA Resin 455 by Dow Chemical U.S.A.

As noted above, the elastomeric phase preferably comprises a copolymer of ethylene and an acrylic ester comonomer. The acrylic ester is preferably methyl acrylate but other alkyl acrylates and methacrylates can be utilized. As a practical matter, the acrylic ester comonomer should be a lower alkyl ester, i.e. methyl, ethyl, propyl or butyl. Although the acrylic ester content of this copolymer may range from about 1 to about 50% by weight, it preferably should fall in the range of 5 to 30% by weight and, more preferably, between about 10 to about 25% by weight. Exemplary ethylene/acrylic ester copolymers useful in the blends of the invention include the copolymer of ethylene and methyl acrylate having a melt index of 6 and a methyl acrylate content of 18% by weight sold under the trade designation "TD 938-70" by Gulf Oil Chemicals Co.; the copolymer of ethylene and methyl acrylate having a melt index of 2, a density of 0.942 g/cc and a methyl acrylate content of 18 to 20% by weight sold under the trade designation POLY-ETH 2205 by Gulf; and the ethylene/methyl acrylate copolymer having a methyl acrylate content of 17%, a melt index of 2.1 to 2.4 and a density of 0.942 g/cc sold under the trade designation POLY-ETH 2255 by Gulf.

Although ethylene/alkyl acrylates and methacrylates are the preferred elastomers and 50%+ neutralized ionomers the preferred polymeric emulsifiers, the invention contemplates the alternative use of other elastomers and polymeric emulsifiers which provide dispersal of a the polyamide and attainment of a notched Izod impact strength of 8.0 ft.lb./in. or more. Those skilled in the art may readily identify combinations of elastomers and emulsifiers which provide the desired extent of dispersal and interphase adhesion that is achieved in the present invention. Generally, the polyamide emulsifier must contain moieties that are compatible with the elastomeric phase and functionality which has affinity for the amide groups of the polyamide sufficient for dispersal and interphase adhesion comparable to that realized with ethylene/acrylic acid ionomers in an ethylene/acrylic ester-polyamide system. Most desirably, the particle size, of dispersed polyamide should be between about 0.01 and about 20μ, and the strength and adhesion of interphase bonding should be comparable to that achieved with ionomers containing at least 3% (typically up to 20%) by weight acrylic acid units, at least 50% of which are neutralized by displacement of protons with metal ions.

Generally, the polyamide should constitute between about 60 and about 90% by weight of the resin blend. Where an ionomer-ethylene/acrylic ester combination is used, the ionomer content should be between about 5% and about 20%, preferably between about 10 and about 20%, by weight; and the ethylene/acrylic ester copolymer content should be between about 5 and about 20%, preferably between about 5 and about 15%, by weight. It is also preferred that the blend comprise between about 1.5 and about 9 parts by weight dispersed phase per part by weight elastomeric phase.

Other components may be present in the blends of the invention in generally rather minor amounts. Fillers can be employed such as, for example, talc in a typical proportion of 0.2 to 0.4% by weight. Pigments such as carbon black can be present in comparable proportions. Antioxidants may be usefully incorporated in the blends of the invention, conveniently in proportions of about 1% by weight. Useful antioxidants include 4,4'di-(1,1,3,3-tetramethylbutyl) diphenylamine sold under the trade designation "Octamine Antioxidant" by Naugatuck Division of U.S. Rubber. Also useful is the hydroperoxide decomposer antidegradant tetrakis (2,4-ditertbutylphenyl)-4,4'-biphenylenediphosphonite sold under the trade designation "Sandostab P-EPQ" by Sandoz Colors & Chemicals Company.

In accordance with the method of the invention, the three resinous components of the blend are mixed intensively and then extruded. The process can be carried out on a continuous basis by injecting an ionomer and an ethylene/acrylic ester copolymer into a molten polyamide in the lower portion of a continuous polyamide polymerization reactor near an exit thereof. In such instance, an extrudate is produced at the extruder that is typically positioned to receive resinous effluent from the reactor. Alternatively, polyamide leaving the reactor may be extruded, pelletized, washed and dried, then tumble blended with the polymeric emulsifier and elastomer prior to a separate extrusion step for the blend. The latter approach requires an additional extrusion step but is advantageous in facilitating elimination of water and producing a dry blend material. Because of the tendency for ethylene/acrylic ester and ionomer pellets to separate from each other due to the buildup of a static charge, the incorporation in the dry blend of a wetting agent, such as the polyoxyethylene derivative of a fatty acid partial ester of sorbitol anhydride sold under the trade designation "Tween 20" by ICI United States, Inc., is preferred. Alternatively, adequate uniformity can be maintained by use of small batches, for example, 500 lbs. total weight or less.

As noted, it is important that the components of the blends of the invention be mixed at high intensity in order to provide a highly intimate mixture. Where the desirable degree of intensity is employed, a dispersion is produced wherein particles comprising the polyamide and having a particle size of between about 0.01 and about 20 microns are dispersed as a separate phase in the continuous elastomeric phase. The desired intensity of mixing is also sufficient to produce adhesion between the phases along the interfaces therebetween. It is believed that high intensity mixing further promotes bonding of substantially all of the carboxyl groups of an ionomer to amide groups of the polyamide. As noted, such bonding is believed to contribute materially to the toughness, crack propagation resistance, high impact strength and high flexural stiffness of the resin blends of the invention.

In the extruder, the blend is heated to a temperature above the melting point of the polyamide resin constituent, typically in the range of 450° to 550° F. Upon extrusion, a strand of extrudate is produced which is conveniently sheared to provide flowable pellets which are adapted for easy bulk handling.

The blends of the invention are useful both as molding compounds, in which they preferably exhibit a flexural modulus of at least about 180,000 psi, and also as extrudable materials for production of tubing and film. In the case of tubing, it is preferred that the blends exhibit a flexural stiffness of at least about 100,000 psi. The superior impact strength of the blends is maintained down to temperatures below 0° C. Resistance to fatigue cracking is also excellent even at low temperatures. The blends of the invention are further characterized by high melt strength which renders them useful in blow molding, preparation of blown film and other comparable applications.

Blends of the invention normally have a melt index of at least about 1, though for some high dimensional stability applications melt indices as low as about 0.2 are achievable and may be suitable. Normally the melt index is less than about 10, but for many applications this is not critical.

The following examples illustrate the invention:

EXAMPLE 1

A blend (designated as No. 1264) was prepared containing a molding grade polycaprolactam (Nylon 6) (80% by weight), an ionomer consisting of a copolymer of ethylene and acrylic acid containing 10% by weight acrylic groups and partially neutralized with sodium, sold under the trade designation "Surlyn 1856" by DuPont (13% by weight), and a copolymer of ethylene and methyl acrylate containing 18% by weight methyl acrylate sold under the trade designation "TD 938-70" by Gulf Oil Chemicals Co. (7% by weight). Pelletized resin components were tumble blended and compounded by extrusion at 475° F. using a Werner & Pfleiderer 83 mm model ZSK twin screw extruder. The extrudate was sheared into pellets and dried in a vacuum dryer to a moisture content of less than 0.1% by weight. Bar specimens $\frac{1}{8}"\times\frac{1}{2}"\times 5"$ were molded from the dried pellets on a Van Dorn injection molder. The molded bars were cooled to 73° F. over a dessicant in a sealed container. Specimens were then notched and tested in accordance with the Izod notched impact strength test (ASTM D-256) and found to have an impact strength of 12.5 ft.-lb/in of notch. A similar blend (No. 1266) prepared in the same fashion except that "Surlyn 1855" was substituted in lieu of "Surlyn 1856". "Surlyn 1855" is a copolymer of ethylene and acrylic acid containing 10% by weight acrylic units, 80% of which are neutralized with zinc. Blend 1266 exhibited a notched Izod impact strength of 15 ft.-lb./in., a flexural stiffness of 187,000 psi, a tensile yield strength of 8000 psi, a tensile modulus of 8500 psi, and an elongation of 250%.

For purposes of comparison, various two component blends were prepared, compounded, molded into test bars and subjected to Izod notched impact strength tests in the manner described above. Similar specimens were prepared from Nylon 6 alone and subjected to the same impact strength test. The results are shown in Table I, along with other properties of certain of the blends. Another two component blend (No. 1314) was prepared containing Nylon 6 (90% by weight) and "Surlyn 1855" ionomer (10% by weight). Blended, extruded, molded and tested in the manner described above, this blend exhibited a notched Izod impact strength of 3 ft.-lb./in. and a flexural stiffness of 233,000 psi.

EXAMPLE 2

Using the method described in Example 1, a series of resin blends were prepared from extrusion grade Nylon 6, Gulf "TD 938-70" ethylene/methyl acrylate copolymer, and DuPont "Surlyn" ionomer 1855 or 1856. Test specimens were prepared from these blends in the manner described in Example 1 and specimens of each blend subjected to the Izod notched impact strength test per ASTM D-256. Compositions of the blends of this example and the notched impact strengths thereof are set forth in Table II, together with other properties for certain of the blends.

EXAMPLE 3

Using the method described in Example 1, a resin blend was prepared containing extrusion grade Nylon 6 having a relative viscosity of 70 (75% by weight), "Surlyn 1855" (10% by weight) and an ethylene/methyl acrylate copolymer having a melt index of 2, a density of 0.942 g/cc and a methyl/acrylate content of 18 to 20%, sold under the trade designation POLY-ETH 2205 by Gulf Oil Chemicals Co. (10% by weight). Test specimens were prepared from this blend in the manner described in Example 1 and subjected to the Izod notched impact strength (ASTM D-256). Set forth in Table III are the properties of the blend of this Example (No. 1338) and, for comparative purposes, the properties of the Nylon 6 resin used therein. As a further basis of comparison, a two component blend was prepared containing "Surlyn 1855" (20% by weight) and a molding grade Nylon 6 resin (80% by weight). This blend was prepared and tested for notched Izod impact strength in the manner described above. A notched Izod impact strength of 15 ft.-lb./in. and a flexural stiffness of 196,000 psi were obtained. While the notched impact strength of this "Surlyn"/Nylon 6 blend compared favorably with the blends of the invention, the cost of a 20% ionomer blend is relatively high.

EXAMPLE 4

Using the method described in Example 1, a blend (No. 1411) was prepared containing a polyhexamethyleneadipamide (Nylon 66) resin sold under the trade designation "Vydene 21" by Monsanto (75% by weight), "Surlyn 1855" (15% by weight) and Gulf POLY-ETH 2205 (10% by weight). Compounded, molded and tested in the manner described in Example 1, this blend exhibited a notched Izod impact strength of 14 ft.-lbs./in. and a flexural stiffness of 188,000 psi.

EXAMPLE 5

Using the method described in Example 1, a resin blend (No. 1365) was prepared containing an extrusion grade Nylon 6 (75% by weight), Surlyn 1855 (15% by weight) and Gulf POLY-ETH 2205 (10% by weight). Using the same general method, another blend was made by compounding blend 1365 (two parts by weight) with a molding grade Nylon 6 (one part by weight). This blend was designated No. 1418. Another blend (No. 1419) was prepared by blending and compounding equal parts of blend 1365 and the molding grade Nylon resin; and still another blend (No. 1420) was prepared by blending two parts of the molding grade Nylon with one part of blend No. 1365. The compositions, impact strengths and flexural stiffness measurements for the blends of this example are set forth in Table IV.

EXAMPLE 6

Using the method described in Example 1, a series of resin blends was prepared containing an extrusion grade Nylon 6 (75% by weight), Gulf POLY-ETH 2205 ethylene/methyl/acrylate copolymer (10% by weight) and various DuPont "Surlyn" brand ionomers (15% by weight). Each of these ionomers is a copolymer of ethylene and acrylic acid neutralized with either sodium or zinc. Set forth in Table V are the notched Izod impact strength and flexural stiffness for each of the blends of this example.

EXAMPLE 7

Using the method described in Example 1, a further series of blends was prepared from various Nylon 6 resins, DuPont "Surlyn 1855" and Gulf ethylene-/methyl acrylate resin. In certain of these, minor amounts of fillers, antidegradants and antioxidants were included. Compositions and properties of these blends are shown in Table VI.

FIG. 1 is a photomicrograph, taken at a magnification of 9000x, of blend No. 1369. It shows particles of polyamide, ranging in size from approximately 0.06 to 2.5μ dispersed in an elastomeric matrix phase. Particle size distributions could be varied somewhat from that shown in FIG. 1 by varying extrusion temperature, extrusion rate, mixing intensity and blend composition.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

TABLE I

| Blend | Nylon 6 Content | Surlyn 1856 Content | Gulf TD 983-70 Content | Izod Impact Strength ft-lb./in. | Flexural Modulus | Tensile Yield | Tensile Modulus | Elongation |
| --- | --- | --- | --- | --- | --- | --- | --- | --- |
| 0 | 100 | — | — | 0.7 | 260,000 psi | — | — | — |
| 1194 | 95 | 5% | — | 3.1 | 118,000 | 5900 psi | 11000 psi | 275% |
| 1195 | 90 | 10 | — | 2.0 | 156,000 | 6700 | 12000 | 300 |
| 1260 | 95 | — | 5% | 1.0 | — | — | — | — |
| 1261 | 90 | — | 10 | 0.6 | — | — | — | — |
| 1262 | 80 | — | 20 | 0.7 | — | — | — | — |
| 1318 | 90 | — | 10 | 0.7 | 260,000 | — | — | — |

TABLE II

| Blend | Nylon 6 Content | Ionomer Type | Ionomer Content | Gulf TD 983-70 Content | Izod Impact Strength ft-lb./in. | Flexural Stiffness | Yield | Tensile Modulus | Elongation |
| --- | --- | --- | --- | --- | --- | --- | --- | --- | --- |
| 1268 | 80 | 1856 | 13 | 7 | 3.5 | 187,000 | 8200 | 11000 | 300 |
| 1269 | 80 | 1855 | 13 | 7 | 15 | 194,000 | 8100 | 10500 | 300 |
| 1270 | 80 | 1855 | 13 | 7 | 15 | — | — | — | — |
| 1274 | 90 | 1855 | 5 | 5 | 4 | 244,000 | — | — | — |
| 1275 | 85 | 1855 | 10 | 5 | 14 | 209,000 | — | — | — |
| 1276 | 80 | 1855 | 15 | 5 | 6 | 159,000 | — | — | — |
| 1277 | 75 | 1855 | 20 | 5 | 15 | 183,000 | — | — | — |
| 1278 | 85 | 1855 | 5 | 10 | 15 | 196,000 | — | — | — |
| 1279 | 80 | 1855 | 10 | 10 | 15 | 190,000 | — | — | — |
| 1280 | 75 | 1855 | 15 | 10 | 15 | 174,000 | — | — | — |
| 1281 | 70 | 1855 | 20 | 10 | 15 | 161,000 | — | — | — |
| 1282 | 80 | 1855 | 5 | 15 | 6 | 186,000 | — | — | — |
| 1283 | 75 | 1855 | 10 | 15 | 15 | 167,000 | — | — | — |
| 1284 | 70 | 1855 | 15 | 15 | 15 | 170,000 | — | — | — |
| 1285 | 65 | 1855 | 20 | 15 | 15 | 142,000 | — | — | — |
| 1286 | 75 | 1855 | 5 | 20 | 3 | 163,000 | — | — | — |
| 1287 | 70 | 1855 | 10 | 20 | 13 | 162,000 | — | — | — |
| 1288 | 65 | 1855 | 15 | 20 | 15 | 143,000 | — | — | — |
| 1290 | 80 | 1855 | 13 | 7 | 6 | 199,000 | — | — | — |
| 1291 | 80 | 1855 | 13 | 7 | 15 | 187,000 | — | — | — |

TABLE III

| Blend | Notched Izod Impact | Flexural Stiffness psi | Yield Strength psi | Tensile Strength psi | Elongation Percent | Heat Deflection 264 psi |
| --- | --- | --- | --- | --- | --- | --- |
| 1338 | 15 | 152,000 | 7,000 | 10,500 | 275 | 57C |
| Nylon 6 | 1 | 260,000 | 10,200 | 10,200 | 200 | 75C |

TABLE IV

| Blend No. | Polyamide Content | Surlyn 1855 Content | Ethylene/Methyl/acrylate Copolymer Content | Notched Izod Impact Strength ft.-lb./in. | Flexural Stiffness |
| --- | --- | --- | --- | --- | --- |
| 1365 | 75% | 15% | 10% | 15 | 160,000 |
| 1418 | 83.3 | 10 | 6.7 | 15 | 221,000 |
| 1419 | 87.5 | 7.5 | 5 | 3 | 232,000 |
| 1420 | 91.7 | 5 | 3.3 | 2 | 251,000 |

TABLE V

| Blends | Ionomer Ion Type | % Acid | Surlyn Type | Neutralization % | Notched Impact Strength (ft.lb./in) | Flexural Stiffness (psi) |
|---|---|---|---|---|---|---|
| 1423 | zinc | 12 | 1801 | 40 | 13 | 202,000 |
| 1424 | zinc | 12 | 1650 | 38 | 12 | 206,000 |
| 1425 | sodium | 10 | 1559 | 60 | 2 | 197,000 |
| 1436 | zinc | 10 | 1554 | 80 | 15 | 196,000 |
| 1427 | zinc | 15 | 1706 | 40 | 10 | 160,000 |

TABLE VI

| Blend | Polyamide % | Ionomer Type | Ionomer Percent | Ethylene/Acrylic Ester Copolymer Type | Ethylene/Acrylic Ester Copolymer Percent | Other Additives Type | Other Additives Percent | Ft.-lbs./in. Impact | M psi Stiffness | psi Tensile | psi Yield | % Elongation |
|---|---|---|---|---|---|---|---|---|---|---|---|---|
| 1299 | 79.98 | 1855 | 13 | TD 938-70 | 7 | Talc | 0.1 | 15 | 206 | — | — | — |
| 1309 | 80.02 | 1855 | 13 | TD 938-70 | 7 | Talc | 0.02 | 15 | 201 | — | — | — |
| 1310 | 80 | 1855 | 7 | TD 938-70 | 13 | | | 15 | 189 | — | — | — |
| 1311 | 79.75 | 1855 | 10 | TD 938-70 | 10 | Talc | 0.25 | — | — | | | |
| 1312 | | | | | | | | 0.7 | 274 | — | — | — |
| 1313 | 95 | 1855 | 5 | | | | | 1.7 | 254 | — | — | — |
| 1315 | 85 | 1855 | 15 | | | | | 9.6 | 216 | — | — | — |
| 1317 | 95 | | | TD 938-70 | 5 | | | 1.3 | 241 | — | — | — |
| 1319 | 85 | | | TD 938-70 | 15 | | | 0.7 | 214 | — | — | — |
| 1320 | 80 | | | TD 938-70 | 20 | | | 1.1 | 198 | — | — | — |
| 1321 | 75 | 1855 | 25 | | | | | 15 | 175 | — | — | — |
| 1322 | 70 | 1855 | 30 | | | | | 15 | 169 | — | — | — |
| 1323 | 65 | 1855 | 35 | | | | | 15 | 156 | — | — | — |
| 1324 | 60 | 1855 | 40 | | | | | 15 | 142 | — | — | — |
| 1325 | 80 | 1855 | 20 | | | | | 15 | 203 | — | — | — |
| 1326 | 79.9 | 1855 | 20 | | | Talc | 0.1 | 15 | 208 | — | — | — |
| 1327 | 79 | | | | | ZnO | 1 | | | | | |
| | | | | | | Dow 455 | 20 | | | | | |
| 1328 | 70 | | | | | Dow 455 | 30 | | | | | |
| 1329 | 70 | | | 2205 | 15 | Dow 455 | 15 | | | | | |
| 1330 | 79 | | | 2205 | 20 | LiCl | 1 | | | | | |
| 1331 | 80 | 1855 | 15 | 2205 | 5 | | | | | | | |
| 1339 | 80 | 1855 | 15 | 2205 | 5 | | | | 186 | | | |
| 1340 | 85 | | | 2205 | 15 | Dow 455 | 15 | | | — | — | — |
| 1341 | 74.95 | 1855 | 15 | 2205 | 10 | Sodium Hypophosphite | 0.05 | | | — | — | — |
| 1343 | 80 | 1855 | 15 | 2205 | 5 | | | 6 | 169 | 8,800 | 7200 | 240 |
| 1344 | 80 | 1855 | 15 | 2205 | 5 | | | 3.6 | 178 | 8,400 | 8200 | 250 |
| 1345 | 75 | 1855 | 15 | 2205 | 10 | | | 15 | 174 | 10,900 | 7800 | 275 |
| 1347 | 74.5 | 1855 | 15 | 2205 | 10 | IRG 1098[1] P-EPQ[2] | 0.5 ea. | 15 | 145 | 10,000 | 5700 | 300 |
| 1353 | 75 | 1855 | 15 | 2205 | 10 | | | 15 | 153 | 8,900 | 6300 | 275 |
| 1354 | 74.6 | 1855 | 15 | 2205 | 10 | Talc | 0.4 | 15 | 162 | 9,900 | 6900 | 300 |
| 1355 | 69.5 | 1855 | 15 | TD 938-70 | 15 | IRG 1098 P-EPQ | 0.5 ea. | — | — | — | — | — |
| 1359 | 69.5 | 1855 | 15 | 2205 | 15 | IRG 1098 P-EPQ | 0.5 ea. | 13.5 | 146 | 9,200 | 5500 | 300 |
| 1363 | 74 | 1855 | 15 | 2205 | 10 | IRG 1098 P-EPQ | 0.5 ea. | 15 | 162 | 9,800 | 6600 | 250 |
| 1365 | 74 | 1855 | 15 | 2205 | 10 | IRG 1098 P-EPQ | 0.5 ea. | | | — | — | — |
| 1367 | 74 | 1855 | 15 | 2205 | 10 | IRG 1098 P-EPQ | 0.5 ea. | 15 | 170 | 8,000 | 6500 | 200 |
| 1369 | 74 | 1855 | 15 | 2205 | 10 | IRG 1098 P-EPQ | 0.5 ea. | 15 | 217 | — | — | — |
| 1371 | 74 | 1855 | 15 | 2205 | 10 | IRG 1098 P-EPQ | 0.5 ea. | 15 | 155 | 10,600 | 6400 | 275 |
| 1381 | 75 | 1856 | 15 | 2205 | 10 | | | 12.5 | 197 | 12,000 | 7400 | 300 |
| 1390 | 69 | 1855 | 15 | TD 938-70 | 15 | IRG 1098[2] P-EPQ[1] | 0.5 ea. | 9.4 | 180 | 8,100 | 7600 | 275 |
| 1411 | 75[3] | 1855 | 15 | 2205 | 10 | | | 13.6 | 188 | — | — | — |
| 1412 | 75 | 1855 | 15 | 2205 | 10 | | | | | — | — | — |
| 1413 | 74.9 | 1855 | 15 | 2205 | 10 | SMA[5] | 0.1 | | | — | — | — |
| 1414 | 74.5 | 1855 | 15 | 2205 | 10 | CaCO$_3$ | 0.5 | 15 | 207 | — | — | — |
| 1415 | 70 | 1855 | 15 | 2205 | 10 | CaCO$_3$ | 5 | 9 | 216 | — | — | — |
| 1416 | 73 | 1855 | 15 | 2205 | 10 | IMSIL A-10[6] | 2 | 15 | 184 | — | — | — |
| 1417 | 70 | 1855 | 15 | 2205 | 10 | IMSIL A-10 | 5 | 15 | 187 | — | — | — |
| 1428 | 90 | 1855 | 5 | 2205 | 5 | | | 1.9 | 227 | — | — | — |
| 1429 | 90 | | | | | IMSIL A-10 | 10 | 2.5 | 184 | — | — | — |
| 1430 | 90 | | | | | CaCO$_3$ | 10 | 2 | 173 | — | — | — |
| 1431 | 65 | 1855 | 15 | 2205 | 10 | CaCO$_3$ | 2.9 | 166 | | | | |
| 1434 | 70 | 1855 | 15 | 2205 | 10 | IMSIL A-10 CaCO$_3$ | 4.5 0.5 | 7.8 | 164 | | | |

TABLE VI-continued

| Blend | Poly-amide % | Ionomer Type | Ionomer Percent | Ethylene/Acrylic Ester Copolymer Type | Ethylene/Acrylic Ester Copolymer Percent | Other Additives Type | Other Additives Percent | Ft.-lbs./in. Impact | M psi Stiffness | psi Tensile | psi Yield | % Elongation |
|---|---|---|---|---|---|---|---|---|---|---|---|---|
| 1442 | 73 | 1855 | 15 | 2205 | 10 | Carbon Blk | 2 | — | — | — |

[1]IRG N,N'-hexamethylene bis(3,5-di-tert-butyl-4-hydroxy-hydrocinnamamide)
[2]P-EPQ (tetrakis[2,4-di-tert-butylphenyl]4,4'-biphenylylenediphosphonite)
[3]Nylon 6/G
[4]Nylon G except where adhesive noted
[5]Styrene/maleic anhydride resin
[6]Amorphous silica

What is claimed is:

1. A high impact strength resin composition comprising between about 60% and about 85% by weight of a polyamide, between about 5% and about 20% by weight of a copolymer of ethylene and an acrylic ester comonomer selected from the group consisting of alkyl acrylates and alkyl methacrylates containing between about 1 and about 50% by weight of repeating units derived from said comonomer, and between about 10% and about 20% by weight of an ionomer comprising a copolymer of ethylene and an $\alpha,\beta$ unsaturated carboxylic acid in which at least about 50% of the carboxylic acid groups are neutralized by replacement of a proton with zinc.

2. A composition as set forth in claim 1 wherein said copolymer of ethylene and $\alpha,\beta$ unsaturated carboxylic acid contains at least about 3% by weight of repeating units derived from said acid.

3. A composition as set forth in claim 2 wherein at least about 75% of said carboxylic acid groups are neutralized by replacement of a proton with zinc.

4. A composition as set forth in claim 1 wherein said copolymer of ethylene and acrylic ester contains between about 5 and about 30% by weight of repeating units derived from said acrylic ester comonomer.

5. A composition as set forth in claim 4 wherein said copolymer of ethylene and acrylic ester contains between about 10% and about 20% by weight of repeating units derived from said acrylic ester comonomer.

6. A composition as set forth in claim 1 wherein said acrylic ester comprises methyl acrylate.

7. A high impact strength resin composition consisting essentially of:
   between about 60 and about 85% by weight of a polyamide selected from the group consisting of polycaprolactam, polyhexamethyleneadipamide, polyhexamethylenesebacamide, poly-11-aminoundecanoic acid and poly (dodecyl lactam);
   between about 5% and about 20% by weight of a copolymer of ethylene and an acrylic ester comonomer selected from the group consisting of alkyl acrylates and alkyl methacrylates containing between about 1 and about 50% by weight of repeating units derived from said comonomer; and
   between about 10% and about 20% by weight of an ionomer comprising a copolymer of ethylene and an $\alpha,\beta$ unsaturated carboxylic acid in which at least about 50% of the carboxylic acid groups are neutralized by replacement of a proton with zinc;
   wherein the composition exhibits a high resistance to crack propogation and the composition has a notched Izod impact strength of at least 8.0 ft.lb/in. of notch.

* * * * *